United States Patent [19]
Busler

[11] 3,986,429
[45] Oct. 19, 1976

[54] EXPANSION DOWELL WITH CIRCUMFERENTIALLY EXTENDING PROTRUSIONS

[75] Inventor: Albert Busler, Altmuhldorf, Germany

[73] Assignee: Hilti Aktiengesellschaft, Schaan, Liechtenstein

[22] Filed: Feb. 23, 1976

[21] Appl. No.: 660,386

[30] Foreign Application Priority Data
Feb. 24, 1975 Germany............................ 2507851

[52] U.S. Cl.................................... 85/83; 403/297; 52/585; 52/753 E
[51] Int. Cl.[2] ........................................ F16B 13/06
[58] Field of Search ............ 85/83, 84, 21; 403/292, 403/297, 401; 52/585, 753 E, 758 H

[56] References Cited
UNITED STATES PATENTS

| 1,138,219 | 5/1915 | Hottenroth | 85/83 |
|---|---|---|---|
| 1,296,342 | 3/1919 | Tozzi | 403/292 X |
| 1,817,775 | 8/1931 | Sipe | 52/758 H |
| 1,934,560 | 11/1933 | Rawlings | 85/83 |
| 2,989,788 | 6/1961 | Kessler | 403/401 |
| 3,019,460 | 2/1962 | Corckran | 85/21 X |
| 3,352,191 | 11/1967 | Crawford | 403/292 X |
| 3,405,592 | 10/1968 | Blodee | 403/292 X |
| 3,765,295 | 10/1973 | Ptak | 85/83 X |
| 3,767,233 | 10/1973 | Hodge | 403/292 X |

*Primary Examiner*—Wayne L. Shedd
*Attorney, Agent, or Firm*—Toren, McGeady and Stanger

[57] ABSTRACT

An expansion dowel includes an axially extending sleeve with an axially extending slot in the sleeve. The sleeve has protrusions extending generally circumferentially around and outwardly from the outer surface of the sleeve. At least some of the protrusions are formed each about a central axis extending at an acute angle to the axis of the sleeve. Adjacent pairs of the protrusions are located in planes which intersect on one side of the axis of the sleeve.

7 Claims, 3 Drawing Figures

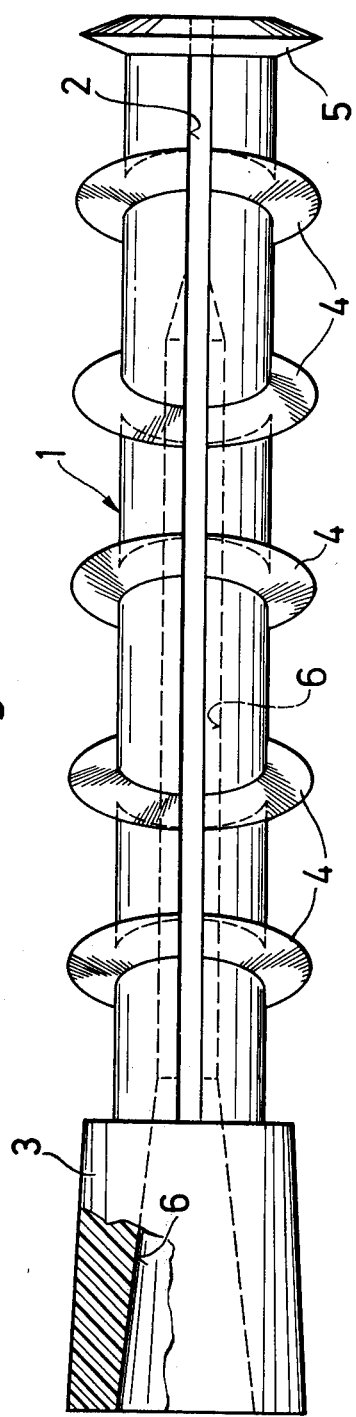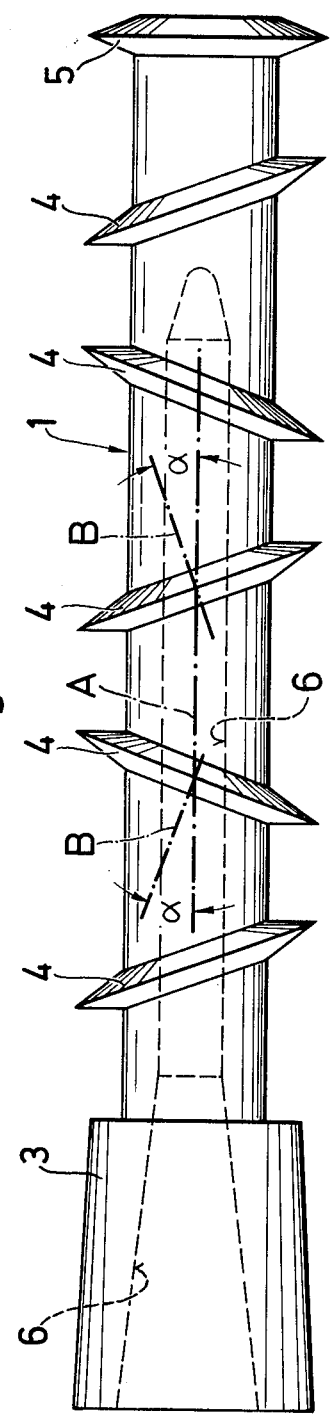

EXPANSION DOWELL WITH CIRCUMFERENTIALLY EXTENDING PROTRUSIONS

SUMMARY OF THE INVENTION

The present invention is directed to an expansion dowel having a sleeve with at least one longitudinal slot and, more particularly, it is directed to circumferentially extending protrusions formed on the outer surface of the sleeve.

Expansion dowels are known which can be spread by an expansion element, for example, a wood screw threaded into a longitudinal recess in the dowel. Such dowels are subdivided by a longitudinal slot into two longitudinally extending halves and, in order to facilitate the assembly, the slot does not extend over the entire axial length of the dowel. To enhance the axial locking of the dowel with the surfaces in a borehole, torus-shaped or similar projections are formed on the outer surface of the sleeve in known dowels.

Since an effective expansion of such dowels can only take place if a relative movement occurs between the expansion element and the dowel, it has been known to provide rotation locks on the outer wall of the dowel to wedge the dowel in its receiving bore so that it cannot rotate with the expansion element. These known rotation locks consist mainly of wing-shaped or finger-shaped parts projecting outwardly from the dowel body.

In practice it has been found that these rotation locks do not always work satisfactorily, because they tend to bend easily and bear against the outer surface of the dowel body with the result that the desired wedging action in the receiving bore cannot be achieved. When this occurs, the dowel can rotate with the expansion element and it is not sufficiently anchored into the receiving bore.

Therefore, the primary object of the present invention is to provide an expansion dowel which incorporates an effective rotation lock.

In accordance with the present invention, the problems experienced in the past are overcome by providing the expansion dowel with substantially circumferentially extending protrusions on the outer surface of the dowel sleeve with the central axes of at least certain of the protrusions disposed at an acute angle with the axis of the sleeve.

With the central axis of the protrusion disposed at an acute angle to the axis of the sleeve, the plane of the protrusion is inclined at an acute angle to a plane extending perpendicularly through the axis of the sleeve and, as a result, the protrusion has both an axial and a radial force component. Due to the combination of the force components, a wedging effect is obtained when a dowel is expanded and the dowel is held both against rotation as well as against axial displacement. This type of rotation lock has the advantage over conventional devices in that it does not require additional elements and the parts forming the lock are extremely stable and cannot lose their function by displacement or bending on the dowel body.

With the protrusions inclined relative to a plane extending perpendicularly to the axis of the dowel sleeve there is the result that the turning movement of an expansion body, for example, a wooden screw, is substantially reduced, since the protrusions are constantly pressed into the wall of the receiving bore over a long axial screw path.

To increse the action of the radial force components, adjacent ones of the protrusions are inclined relative to one another and the central axis of each of the protrusions forms a similar angle with the longitudinal axis of the dowel. In other words, the protrusions are located in planes which intersect as they extend outwardly from one side of the dowels. In addition to the inclined protrusions, additional protrusions extending perpendicularly to the axis of the dowel can be provided which merely have to absorb the force component acting in the axial direction.

Preferably, the acute angle between the central axis of the protrusions and the longitudinal dowel axis is about 5° to 20°.

Optimum conditions are obtained with the protrusions inclined in such an angular range, that is, in addition to the optimum security against rotation, a satisfactory locking action is provided against the axial displacement of the dowel.

Particularly in an expansion dowel divided by a longitudinal slot into longitudinal halves, it is advisable if the plane containing the central axes of the protrusions is located in the plane of the longitudinal slot. In this way the wedging action of the protrusions and, therefore, the security against rotation, is not reduced, even if the dowel halves are driven apart by the expansion element or body.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWING

In the drawing:

FIG. 1 is a side view of an expansion dowel embodying the present invention;

FIG. 2 is a top view of the expansion dowel shown in FIG. 1; and

DETAILED DESCRIPTION OF THE INVENTION

Figure 3:
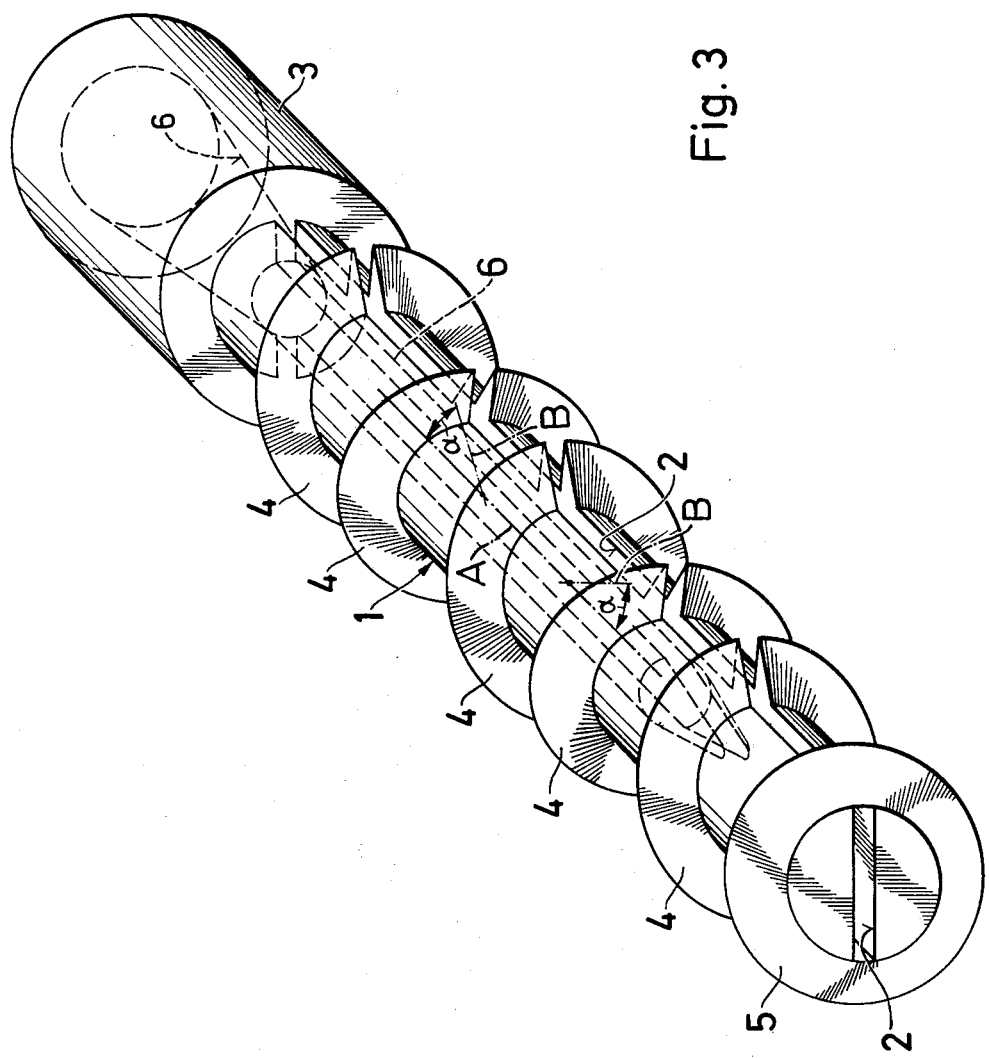
FIG. 3 is a perspective view of the expansion dowel shown in FIGS. 1 and 2.

In FIGS. 1, 2 and 3 an expansion dowel is illustrated having an axially extending sleeve 1. As can be seen best in FIGS. 1 and 3, the sleeve 1 has an axially or longitudinally extending slot 2. To prevent the sleeve 1 from separating into two halves, it is provided at its rear end with a collar 3 for facilitating the assembly of the dowel. The slot 2 does not extend into the collar 3. However, as can be seen in FIGS. 1 and 3, the slot extends to the forward end of the sleeve 1.

The sleeve 1 between the collar 3 and its forward end is provided with circumferentially extending protrusions 4 which alternate in the angle of inclination of the planes of the protrusions with the axis A of the sleeve. In other words, each pair of adjacent protrusions are in converging relationship on one side of the axis A and are in diverging relationship on the other side of the axis A. The central axes B of the protrusions 4 extend in the plane of the slot 2 and each of the axes forms an acute angle with the axis A of the sleeve, preferably in an angular range of 5° to 20°. Further, an annular protrusion 5 located at the forward end of the sleeve and the plane of this protrusion extends perpendicularly to the axis A of the dowel. In the illustrated example, the longitudinal slot does not extend outwardly through the protrusion 5 and, as a result, the protrusion forms a connection between the two longitudinal dowel halves at the forward end. This arrangement affords a further aid in the assembly of the dowel. Naturally, the attachment at the forward end between the dowel halves can be provided by a simple web which is separated when an expansion element is driven into the receiving bore 6 in the dowel.

To provide guidance for the expansion element to be driven into the dowel, a longitudinal recess in the form of an axially extending bore 6 is provided through the collar 3 in the sleeve 1. The bore 6 tapers inwardly at its forward and leading ends. In longitudinally slotted expansion dowels, it is not necessary for the longitudinal recess or bore to traverse the entire length of the dowel, note the arrangement of the bore 6 shown in FIGS. 1, 2 and 3.

While a specific embodiment of the invention has been shown and described in detail to illustrate the application of the inventive principles, it will be understood that the invention may be embodied otherwise without departing from such principles.

I claim:

1. Expansion dowel including an axially elongated sleeve having a slot therein extending in the axial direction thereof, said sleeve having an axially extending outer surface, and a plurality of circumferentially extending protrusions formed on and extending outwardly from said outer surface, each of said protrusions having a central axis, wherein the improvement comprises that the central axis of at least a portion of said protrusions are each disposed at an acute angle to the axis of said sleeve.

2. Expansion dowel, as set forth in claim 1, wherein adjacent pairs of said protrusions are arranged so that the planes of said protrusions are in converging relationship on one side of the axis of said sleeve.

3. Expansion dowel, as set forth in claim 2, wherein the acute angle between the central axes of said protrusions and the axis of said sleeve in adjacent pairs of said protrusions is the same.

4. Expansion dowel, as set forth in claim 1, wherein the acute angle between the central axes of said protrusions and the axis of said sleeve is in the range of 5° to 20°.

5. Expansion dowel, as set forth in claim 2, wherein the central axis of said protrusions disposed at an acute angle to the axis of said sleeve all extend in a single plane.

6. Expansion dowel, as set forth in claim 5, wherein the plane in which the central axes of said protrusions extend is co-planar with the axially extending plane of said slot.

7. Expansion dowel, as set forth in claim 5, wherein said sleeve has a first end and a second end spaced axially from said first end, an annular protrusion formed about and completely encircling the first end of said sleeve with the central axis of said protrusion being coaxial with the axis of said sleeve, a collar attached to and extending axially from the second end of said sleeve, said collar extending laterally outwardly beyond the outer surface of said sleeve, said longitudinal slot extending between the first end and second ends of said sleeve and a bore extending through said collar and from the second end of said sleeve toward said first end for receiving and guiding an expansion element within the dowel.

* * * * *